United States Patent
Stolzenburg et al.

(10) Patent No.: US 6,435,300 B1
(45) Date of Patent: Aug. 20, 2002

(54) VENT FOR A POWER-ASSISTED STEERING SYSTEM

(75) Inventors: Jens Stolzenburg, Ilsfeld; Bernd Schiek, Winterbach, both of (DE)

(73) Assignee: Mercedes Benz Lenkungen GmbH (DE)

( * ) Notice: Subject to any disclaimer, the term of this patent is extended or adjusted under 35 U.S.C. 154(b) by 0 days.

(21) Appl. No.: 09/545,403

(22) Filed: Apr. 7, 2000

(30) Foreign Application Priority Data

Apr. 16, 1999 (DE) .......................................... 199 17 392

(51) Int. Cl.⁷ ................................................. B62D 5/06
(52) U.S. Cl. ........................ 180/428; 180/400; 180/444
(58) Field of Search ................................ 180/400, 428, 180/444

(56) References Cited

U.S. PATENT DOCUMENTS

| | | | |
|---|---|---|---|
| 4,721,175 A | * 1/1988 | Butler | 180/148 |
| 5,251,717 A | * 10/1993 | Klosterhaus | 180/148 |
| 5,379,856 A | * 1/1995 | Blee | 180/148 |
| 5,685,562 A | * 11/1997 | Jordan et al. | 280/739 |
| 6,155,375 A | * 12/2000 | Giere et al. | 180/428 |

* cited by examiner

Primary Examiner—Kenneth R. Rice
Assistant Examiner—Christopher Buchanan
(74) Attorney, Agent, or Firm—Woodbridge & Associates, P.C.; Richard C. Woodbridge; Charles Manero

(57) ABSTRACT

A gaiter or bellows for a power-assisted steering system for motor vehicles is connected on one hand to a steering gear housing and on the other hand to an adjacent track rod. The gaiter or bellows is characterized in that it is manufactured at least partially from a gas permeable, liquid repellent material. In a common configuration the power assisted steering system has a steering rod disposed in a general longitudinally extending manner in a steering gear housing as well as having track rods associated with the steering rack. The gaiter or bellows is connected in such an application at one end to the steering gear housing and at the other end to an adjacent track rod.

5 Claims, 3 Drawing Sheets

VENT FOR A POWER-ASSISTED STEERING SYSTEM

BACKGROUND OF THE INVENTION

1. Field of the Invention

The present invention relates to a power-assisted steering system for motor vehicles in the form of a rack-and-pinion steering system.

2. Description of Related Art

Such power-assisted steering systems have a steering rack, which is supported so as to be longitudinally displaceable in a steering gear housing and is provided at either end with a track rod tap. The track rods are generally connected by a screw thread and a ball joint to the steering rack. The steering rack, the screw thread and the ball joint are protected from dirt by means of bellows, which are fastened by one end to the track rod and by the other end to the steering gear housing. In the course of a steering movement the volume enclosed by the bellows varies, with the result that the air quantity contained there has to be compensated. For said purpose, in the known power-assisted steering systems a line is provided between the two air volumes arising on the left and right of the rack-and-pinion steering system, thereby enabling a compensation between the two volumes on either side of the rack-and-pinion steering system. Said line is realized either or by means of a longitudinal bore in the steering rack optionally combined with traverse bores or by means of a separate rigid line on the outside of the steering gear housing or bellows.

The construction outlay for provision of said connection is in practice relatively high. On the other hand, in the absence of such a connection some other way of removing the displaced air volume and/or supplying the necessary air volume is required.

SUMMARY OF THE INVENTION

The object of the present invention is therefore to provide a power-assisted steering system for motor vehicles, in which the volumes enclosed by the bellows may be separately varied and/or compensated.

Said object is achieved by a device having the features of claim 1 as well as by a device having the features of claim 6.

Advantageous developments of the invention are described in the sub-claims.

BRIEF DESCRIPTION OF THE DRAWINGS

Embodiments of the present invention are described below with reference to the drawings. The drawings show.

DETAILED DESCRIPTION OF THE INVENTION

Figure 1:
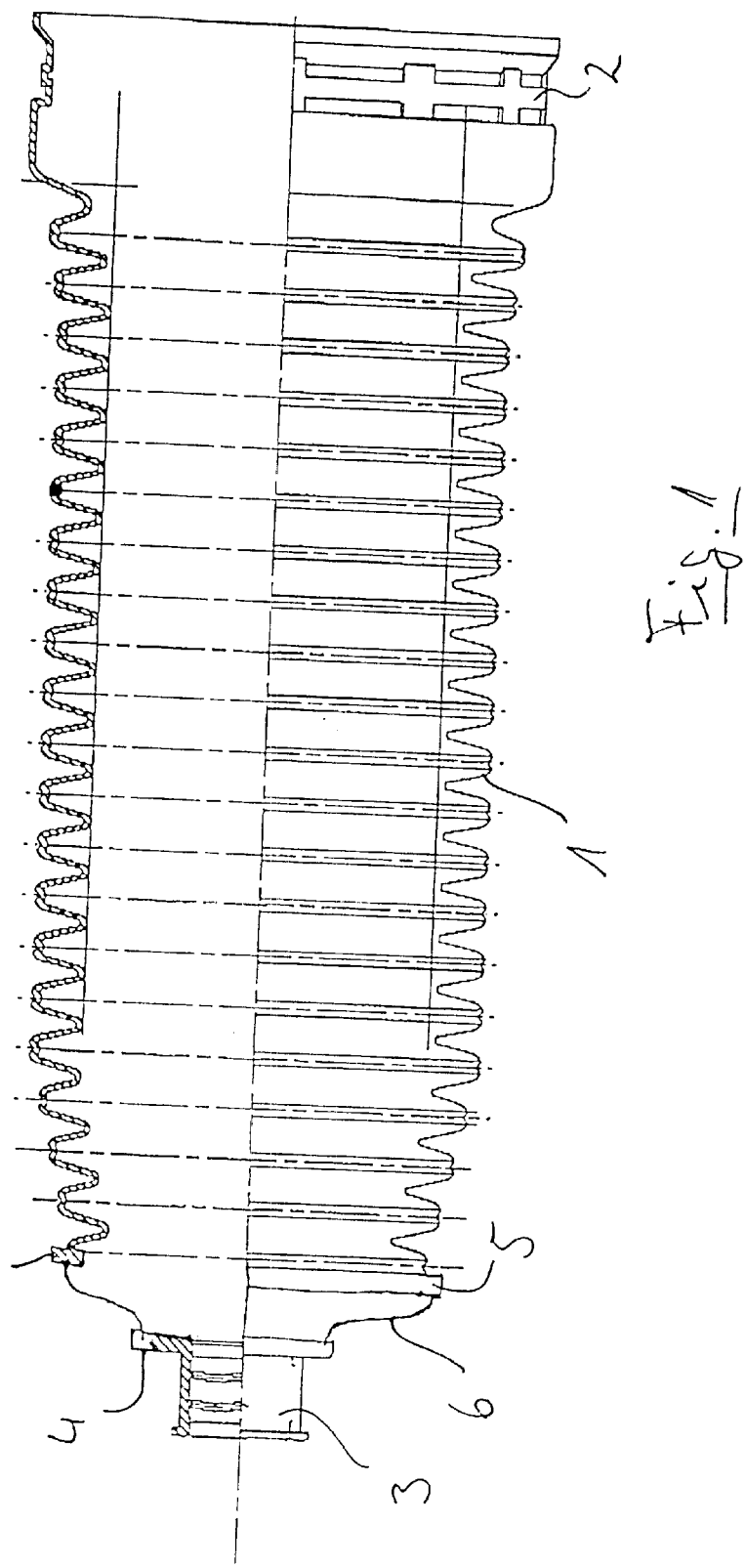
FIG. 1: bellows having a hydrophobic, gas-permeable diaphragm.

FIG. 1 shows bellows 1, which are known per se, for a power-assisted steering system. Such bellows are also known as "steering gaiters". The bellows 1 comprise a large-diameter connection 2 directed towards the steering gear housing as well as a small diameter connection 3 directed towards the track rod. Both connections 2, 3 are usually fastened by clamps to the respective component. In the case of steering gaiters, such bellows are not provided with pressure compensation openings.

The bellows according to FIG. 1 carry in the region of the connection 3 an annular collar 4 made of rubber, which is an integral part of the connection 3. A corresponding collar 5 of a larger diameter is likewise provided on the bellows, only offset outwards from the collar 4 in the direction of the connection 2. Said collar 5 is likewise integrally formed from the material used to manufacture the rest of the bellows.

Extending between the two annular collars 4 and 5 is a diaphragm 6 fashioned in the shape of the envelope of a cone, wherein one open end of a smaller diameter is incorporated by its end face into the collar 4, while the other open end of a larger diameter is incorporated by its annular end face into the collar 5. Advantageously, during manufacture of the bellows the material of the bellows is injection-molded around the end faces or edges of the diaphragm 6.

Figure 2:
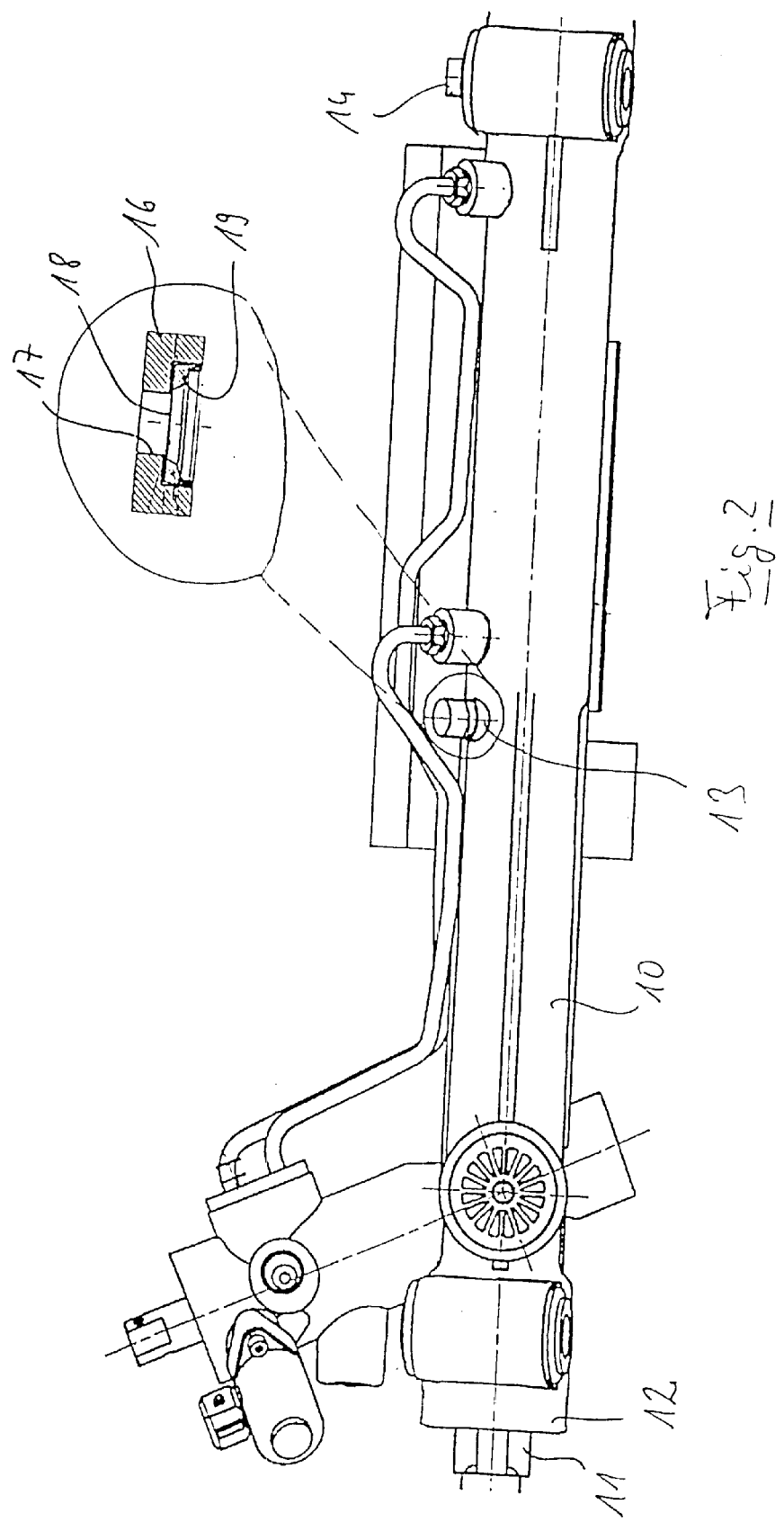
FIG. 2: a steering gear housing for a power-assisted steering system having a vent sealed by a diaphragm.

A power-assisted steering system of an as such know design is shown in FIG. 2. A steering gear housing 10 surrounds, in addition to other components not shown in detail, a steering rack 11. During operation, the open end 12 of the housing adjacent to the steering rack 11 is surrounded and sealed by the end 2 of the bellows 1. The consequently enclosed interior of the power-assisted steering system is aerated and deaerated via a connection 13. A second connection 14 is provided for the—in FIG. 2—right side of the rack-and-pinion steering system, where bellows 1 are likewise disposed. The connections 13, 14 in known designs of power-assisted steering systems are connected to one another by a connection line screwed on there, with the result that a compensation of the air volumes on the left and right side of the power-assisted steering system is effected by means of said connection line. In the embodiment according to FIG. 2, the connection 13, like the connection 14, is provided with a screw cap 16, which is shown to an enlarged scale and has an opening 17 open towards the atmosphere. Inserted in the opening is a hydrophobic, gas-permeable diaphragm 18, the material of which may correspond to that of the diaphragm 6 according to FIG. 1. The diaphragm 18 is secured in the screw cap 16 by means of a molded plastic part 19 and pressed into its bearing surface by the axial force arising when the screw cap is screwed onto the connection 13, thereby rendering it both liquid-proof and loadable within specific limits.

A corresponding screw cap is screwed onto the connection 14 so that the air volume communicating therewith is also sealed in a liquid- and dirt-proof manner but is to a certain extent open to allow gases to pass through to the atmosphere.

Figure 3:
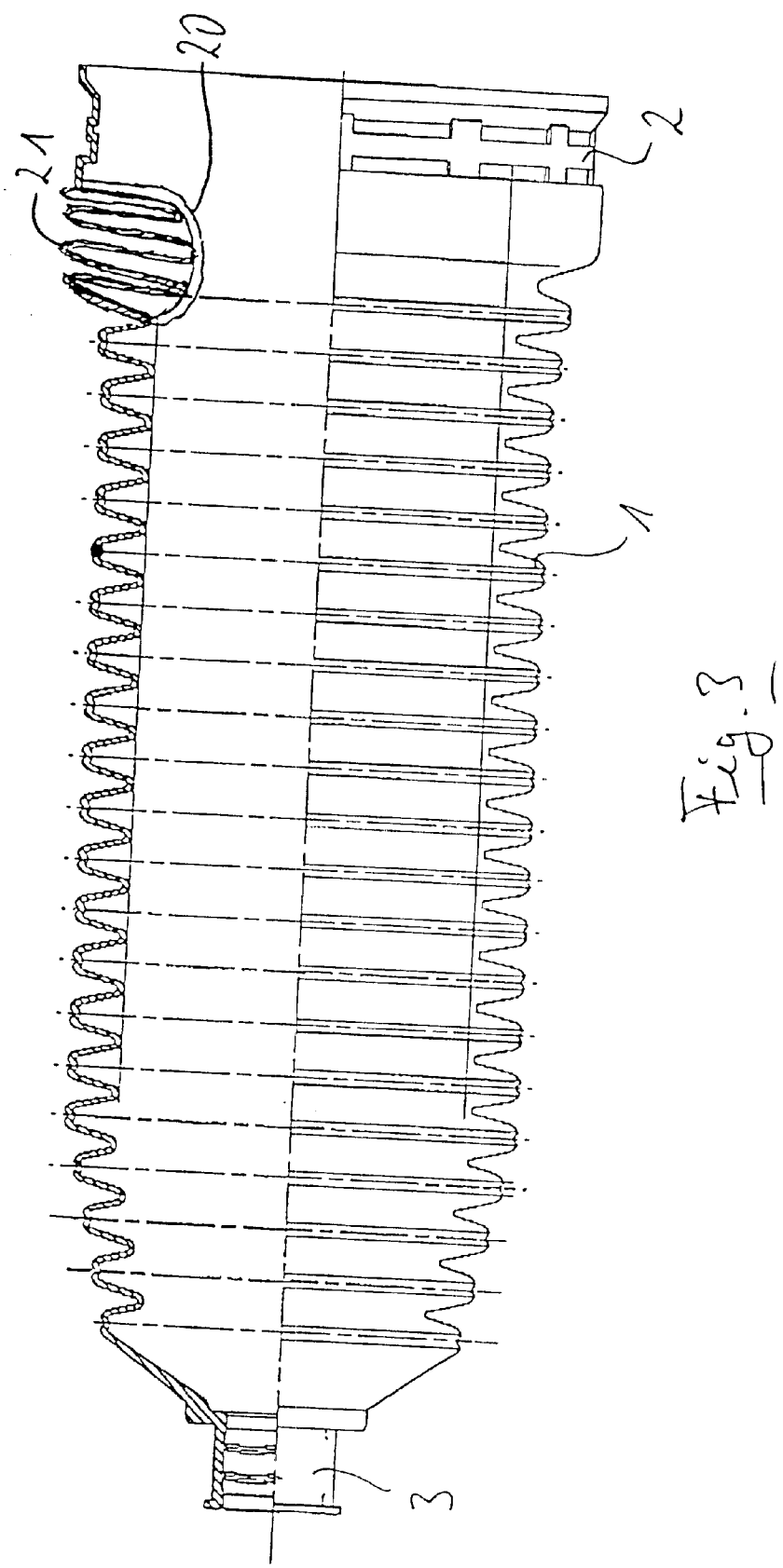
FIG. 3: bellows having an associated flexible expansion chamber.

FIG. 3 shows a further embodiment of bellows 1 with steering-side connection 2 and track rod-side connection 3. In said embodiment, an approximately round region 20 has been cut out of the bellows 1 and provided with a flexible expansion element 21. This may, in the manner shown in FIG. 3, comprise a bellows region having larger folds or greater lift as well as more closely adjacent folds. They may be formed from a different material to the actual bellows 1. In particular, it may also be provided that the region 21 is made of a similar gas-permeable and hydrophobic material to the diaphragms 6 and 18. In said case, the region 21 both by virtue of its high expandability and by virtue of its relatively large surface may allow gases to pass out of, and into, the interior of the bellows.

In practice, the embodiments described thus far operate as follows:

When the steering rack travels into the steering gear housing, the bellows 1 according to FIG. 1 are contracted so that the air quantity surrounded by the bellows has less room available and an overpressure arises. Said overpressure may escape through the diaphragm 6, which is hydrophobic and gas-permeable. The rate of pressure relief is then dependent upon the air volume, the pressure difference, the area of the diaphragm 6 and the mean pore size. When the steering rack travels out, the volume situated in the bellows 2 increases, while the air quantity initially remains constant. The resulting partial vacuum (give previous escape of the enclosed air quantity) gives rise to a gas transfer from the atmosphere through the diaphragm 6 into the interior and hence to the necessary pressure compensation. The other air volume of the rack-and-pinion steering system undergoes the reverse process.

In the rack-and-pinion steering system according to FIG. 2, the air volume in the region of the connection 12 is optionally also sealed off by conventional bellows, which are incapable of an exchange with the atmosphere. In said case, a movement of the steering rack to the right gives rise to the build-up on the left side of an overpressure, which escapes through the connection 13 and the diaphragm 18 situated therein towards the atmosphere. The diaphragm 18 is in said case likewise capable of repelling water, dirt and other undesirable impurities but not of impeding the gas transfer to an undesirable extent. Give the described movement of the steering rack to the right, the—in FIG. 2—right air volume is increased so that the required gas quantity is sucked in from the atmosphere through the connection 14 and a corresponding diaphragm 18. A locking of the steering in the opposite direction by a movement of the steering rack 11 to the left leads to a reversal of the process, with the result that the air to be displaced escapes through the connection 14, while a corresponding air volume is sucked in through the connection 13.

The bellows according to FIG. 3 enable operation similar to the bellows according to FIG. 1. Here however, besides the pure possibility of diffusive gas transfer through the pores of the diaphragm 6, there is also the possibility of mechanical pressure compensation through enlargement of the region 21 in an inward or outward direction. Here, a kind of expansion container arises for the purpose of pressure compensation. When said region 21 is formed by a gas-permeable, hydrophobic diaphragm, the pressure building up there may ultimately likewise escape or gas may be sucked in from the atmosphere. Such an application is preferred when rapid steering movements are anticipated and it is impossible for the volume flows, which are then required within a very short time, to be transferred merely by diffusion through the diaphragms. Here, the fast-reacting, thin-walled expansion element 21 is preferred as a purely mechanical buffer.

The present invention may also be realized in other constellations not described in the embodiments. Thus, for example, it is also provided that the entire bellows 1 be manufactured from a gas-permeable, hydrophobic diaphragm. This has the advantage that the available diffusion surface is very large and hence enables a reliable gas transfer even in the event of a low overpressure. Suitable diaphragms are available e.g. under the brand name Goretex from the company W. L. Gore & Associates, Putzbrunn, Germany. It is also possible to use other diaphragms, preferably based on halogenated hydrocarbons. Other materials may also be considered, provided that the required properties (gas permeability, water-repellent behaviour and imperviousness to liquids) are guaranteed.

Particularly in the embodiment according to FIG. 2, instead of the foil, it is possible to provide as a diaphragm a net, woven cloth or the like having a low mesh size and a hydrophobic surface or surface coating.

The embodiments of the present invention described thus far make it possible in power-assisted steering systems to dispense with the previously customary longitudinal bore through the steering rack or a connection line provided outside of the steering system for pressure compensation between the two volumes at either end.

We claim:

1. A power-assisted steering system for motor vehicles having a steering rack, which is disposed in a longitudinally displaceable manner in a steering gear housing, as well as having track rods associated with the steering rack and having at least one gaiter with a first end and a second end connected on said first end to said steering gear housing and on said second end to the adjacent track rod, wherein said gaiter is manufactured at least partially from a gas-permeable, water-repellant material (6, 21).

2. The power-assisted steering system according to claim 1, wherein the material (6, 21) is a diaphragm which is diffusively permeable by gases.

3. The power-assisted steering system according to claim 2, wherein the material is a foil provided with pores, preferably a plastic foil.

4. The power-assisted steering system according to claim 2, wherein the material (6, 21) forms a substantially rotationally symmetric region of the bellows (1).

5. The power-assisted steering system according to claim 2, wherein the material (21) forms a region (20) of the bellows (1) of high elastic deformability.

* * * * *